United States Patent
Saito et al.

(10) Patent No.: US 8,885,254 B2
(45) Date of Patent: Nov. 11, 2014

(54) LAMINATED DIFFRACTIVE OPTICAL ELEMENT AND OPTICAL SYSTEM

(75) Inventors: Kenichi Saito, Yokohama (JP); Kazutaka Inoguchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/503,175

(22) PCT Filed: Oct. 5, 2010

(86) PCT No.: PCT/JP2010/067807
§ 371 (c)(1),
(2), (4) Date: Apr. 20, 2012

(87) PCT Pub. No.: WO2011/048967
PCT Pub. Date: Apr. 28, 2011

(65) Prior Publication Data
US 2012/0206812 A1  Aug. 16, 2012

(30) Foreign Application Priority Data
Oct. 21, 2009 (JP) ................. 2009-241989

(51) Int. Cl.
*G02B 5/18* (2006.01)
*G02B 27/42* (2006.01)
*G02B 27/00* (2006.01)
*G02B 27/44* (2006.01)

(52) U.S. Cl.
CPC ............ *G02B 27/44* (2013.01); *G02B 27/4272* (2013.01); *G02B 27/0037* (2013.01); *G02B 27/4211* (2013.01); *G02B 5/1823* (2013.01)
USPC .......................................... 359/576; 359/571

(58) Field of Classification Search
USPC ............ 359/566, 569, 576, 571–572; 369/99, 369/112.01, 112.03–112.09, 369/112.11–112.14; 362/317, 341, 343, 362/296.01, 257
See application file for complete search history.

(56) References Cited

U.S. PATENT DOCUMENTS 5,377,044 A * 12/1994 Tomono et al. ............... 359/566
5,999,318 A  12/1999 Morton et al.
(Continued)

FOREIGN PATENT DOCUMENTS

CN  1501103 A  6/2004
CN  101231357 A  7/2008
(Continued)

OTHER PUBLICATIONS

Pedrotti et al. (Introduction to Optics, 2nd Ed.; Prentice Hall: 1993; pp. 402-404).*

(Continued)

*Primary Examiner* — Stephone B Allen
*Assistant Examiner* — Kimberly N Kakalec
(74) *Attorney, Agent, or Firm* — Rossi, Kimms & McDowell LLP

(57) ABSTRACT

The laminated diffractive optical element includes plural diffraction gratings 21, 22 and 23 laminated with each other, the respective diffraction gratings being formed of a same light-transmissive material. In the element, reflective films are formed on grating surfaces 11 and 12 of the respective diffraction gratings, each of the reflective films being disposed between the diffraction gratings. Each of the reflective films reflects light in a specific wavelength range and transmits light in a wavelength range different from the specific wavelength range, the specific wavelength ranges of the respective reflective films being different from each other. The grating surfaces of the respective diffraction gratings are formed in shapes different from each other according to the specific wavelength ranges corresponding to the respective reflective films.

8 Claims, 8 Drawing Sheets

(56) References Cited

U.S. PATENT DOCUMENTS

| | | | |
|---|---|---|---|
| 6,122,104 A * | 9/2000 | Nakai | 359/576 |
| 6,185,043 B1 | 2/2001 | Imamura | |
| 6,449,097 B1 * | 9/2002 | Zhu et al. | 359/576 |
| 6,805,490 B2 * | 10/2004 | Levola | 385/67 |
| 7,206,107 B2 * | 4/2007 | Levola | 359/34 |
| 7,573,640 B2 * | 8/2009 | Nivon et al. | 359/630 |
| 2002/0063962 A1 * | 5/2002 | Takada et al. | 359/569 |
| 2004/0062502 A1 * | 4/2004 | Levola | 385/129 |
| 2004/0263982 A1 * | 12/2004 | Ishii | 359/569 |
| 2008/0310284 A1 | 12/2008 | Takada et al. | |
| 2009/0147362 A1 | 6/2009 | Saito | |

FOREIGN PATENT DOCUMENTS

| | | |
|---|---|---|
| EP | 1162492 A2 | 12/2001 |
| EP | 2045644 A1 | 4/2009 |
| JP | 9189892 A | 7/1997 |
| JP | 2001-330718 A | 11/2001 |
| JP | 2002-318306 A | 10/2002 |
| JP | 2004348165 A | 12/2004 |
| JP | 2005-128260 A | 5/2005 |
| JP | 2005-149594 A | 6/2005 |
| JP | 2005158217 A | 6/2005 |
| JP | 2007-149249 A | 6/2007 |
| JP | 2010020855 A | 1/2010 |

OTHER PUBLICATIONS

EESR issued Feb. 19, 2013 for corres. EP 10824816.2.
EESR issued Feb. 7, 2013 for corres. EP 12187153.7.
International Search Report and Written Opinion issued in PCT/JP2010/067807 dated Oct. 19, 2010.
JP OA issued Jun. 4, 2013 for corres. JP 2012-131570.
Japanese Office Action cited in Japanese counterpart application No. JP2012-131570, dated Nov. 5, 2013.
Notification of the First Office Action for corresponding CN 201080046745.1, dated Oct. 31, 2013. English translation provided.

* cited by examiner

LAMINATED DIFFRACTIVE OPTICAL ELEMENT AND OPTICAL SYSTEM

This application is a U.S. National Phase Application of PCT International Application PCT/JP2010/067807 filed on Oct. 5, 2010 which is based on and claims priority from JP 2009-241989 filed on Oct. 21, 2009 the contents of which are incorporated herein by reference in their entirety.

TECHNICAL FIELD

The present invention relates to a laminated diffractive optical element, and particularly to a laminated diffractive optical element with reduced chromatic aberration.

BACKGROUND ART

Diffractive optical elements (hereinafter referred to as DOEs) provide arbitrary optical powers and have anomalous dispersion characteristics that can effectively reduce chromatic aberration of a refractive optical system.

However, the DOEs are nearly always provided with reduced optical powers to be used in optical systems for multicolor lights so as to correct the chromatic aberration well. This is because a dispersion of the DOE is extremely larger than that of refraction and therefore a DOE having an optical power significantly contributing to image-formation increases differences of diffraction powers for various wavelengths, which increases chromatic aberration generated by the DOE. Thus, performances of the DOEs are not utilized enough.

Japanese Patent No. 3966303 discloses a pickup lens having on its each surface binary step with different heights. This pickup lens sets the height of binary steps on one surface to a value equal to an integral multiple of a wavelength that is not desired to be diffracted through the binary steps and to a value different from an integral multiple of a wavelength that is desired to be diffracted therethrough, thereby diffracting only light of the desired wavelength.

Moreover, Japanese Patent Laid-Open No. 9-189892 discloses a displaying optical system including a liquid crystal DOE. The displaying optical system performs high-speed time division switching of a wavelength of light from a light source such as R→G→B→R→ . . . , and switches parameters of the liquid crystal DOE in synchronization with the time division switching, thereby suppressing generation of aberration.

Description will be made of an example of a transmissive DOE in which concentric annular zones are formed on a transparent flat substrate whose refractive index $n(\lambda_d)$ is 1.5168 ($\lambda_d$=587.56 nm). When a diffraction order of the DOE is +1st order and a focal length thereof is 50 mm, if an entrance pupil is disposed coaxially with the annular zones and a diameter of the entrance pupil is 5 mm, a longitudinal chromatic aberration of R-B ($\lambda_R$=640 nm and $\lambda_B$=480 nm) increases to 15.704 mm. In a case of a refractive lens having a refractive index identical to that of the DOE and a focal length of 50 mm, a curvature radius is −28.63 mm and the longitudinal chromatic aberration of R-B is 0.775 mm.

Furthermore, description will be made of an example of a reflective DOE that converts an incident angle of 25° into a reflection angle of 60° and whose diffraction order is +1st order and focal length is 50 mm. In this DOE, the longitudinal chromatic aberration of R-B increases to 40 mm or more.

These descriptions were made of the cases where the DOE is used alone. However, in a case where the DOE having a strong power is used in an optical system including lenses or mirrors, an extremely large chromatic aberration is generated due to diffraction by the DOE, which may prevent formation of the optical system.

The DOEs disclosed in Japanese Patent No. 3966303 and Japanese Patent Laid-Open No. 9-189892 may solve the above-described problem. However, the DOE disclosed in Japanese Patent No. 3966303 is a multi-level zone plate DOE, which may obtain an insufficient diffraction efficiency. Further, the liquid crystal DOE disclosed in Japanese Patent Laid-Open No. 9-189892 involves a problem that accuracy of an annular zone interval depends on a size of a pixel cell and a problem that temporal responsiveness thereof cannot be sufficiently improved.

SUMMARY OF INVENTION

The present invention provides a laminated diffractive optical element having a strong power and being capable of reducing chromatic aberration generated due to diffraction.

The present invention provides as one aspect thereof a laminated diffractive optical element including plural diffraction gratings laminated with each other, the respective diffraction gratings being formed of a same light-transmissive material, and plural reflective films formed on grating surfaces of the respective diffraction gratings, each of the reflective films being disposed between the diffraction gratings. Each of the reflective films reflects light in a specific wavelength range and transmits light in a wavelength range different from the specific wavelength range, the specific wavelength ranges for the respective reflective films being different from each other. The grating surfaces of the respective diffraction gratings are formed in shapes different from each other according to the specific wavelength ranges for the respective reflective films.

The present invention provides as another aspect thereof a laminated diffractive optical element including plural diffraction gratings laminated with each other, the respective diffraction gratings being formed of light-transmissive materials different from each other. Grating surfaces of the respective diffraction gratings are formed in shapes different from each other. Refractive indices of the diffraction gratings adjacent to each other in a lamination direction in which the diffraction gratings are laminated have mutually different dispersion characteristics for one specific color light. Each of the grating surfaces diffracts the specific color light.

The present invention provides as still another aspect thereof an optical system including the above-described laminated diffractive optical element.

Further features and aspects of the present invention will become apparent from the following description of exemplary examples (embodiments) with reference to the attached drawings.

DESCRIPTION OF EMBODIMENTS

Exemplary embodiments (examples) of the present invention will hereinafter be described with reference to the accompanying drawings.

Example 1

Figure 1:
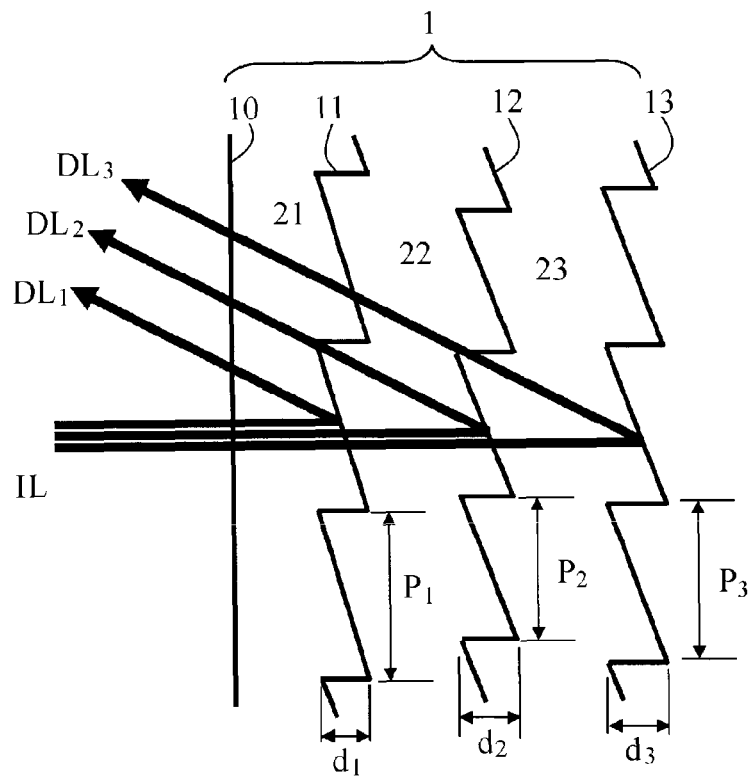
FIG. 1 schematically shows a structure of a reflective DOE that is Example 1 of the present invention.

FIG. 1 shows a reflective laminated DOE (laminated diffractive optical element) 1 that is a first example (Example 1) of the present invention. The DOE 1 is constituted by laminating three diffraction grating layers (diffraction gratings) including a first layer 21, a second layer 22 and a third layer 23. The three diffraction grating layers are formed of a same light-transmissive medium (material), and refractive indices ($n(\lambda)$) thereof are also equal to each other.

A dichroic film as a reflective film that reflects light in a first wavelength range is formed on a grating surface 11 disposed between the first layer 21 and the second layer 22. A dichroic film as a reflective film that reflects light in a second wavelength range is formed on a grating surface 12 disposed between the second layer 22 and the third layer 23.

Moreover, a grating surface 13 is formed as a mirror surface that reflects light transmitted through the first to third layers 21-23. This mirror surface may be formed of a reflective film vapor-deposited on a back surface of the third layer 23 or may be formed of a metal plate.

The reflective films formed on the grating surfaces 11 and 12 are not limited to the dichroic film, and only have to be a film that reflects light in a specific wavelength range (such as the light in the first wavelength range or the light in the second wavelength range) and transmits light in a wavelength range different from the specific wavelength range. The reflection of the light in the specific wavelength range and the transmission of the light in the wavelength range different from the specific wavelength range in this example do not necessarily require 100 percent reflection and 100 percent transmission, that is, may include slight transmission and reflection (for example, 5 or 10 percent transmission and reflection).

Forming the first to third layers 21-23 with the same material as described above makes the entire DOE 1 thin. In a case where the first to third layers 21 to 23 are formed of resin, forming the grating surface 13 that includes the mirror surface on a substrate and then sequentially forming thereon the third layer 23, the dichroic film, the second layer 22, the dichroic film and the first layer 21 can produce the DOE. In this case, an anti-reflection film may be formed on a light entrance side surface 10 of the first layer 21. Furthermore, disposing a transparent substrate further on a light entrance side than the surface 10 and then sequentially forming thereon the first layer 21, the dichroic film, the second layer 22, the dichroic film, the third layer 23 and the reflective film can produce the DOE as a back-surface mirror.

The grating surfaces 11 and 12 on which the dichroic films are formed and the grating surface 13 on which the mirror surface is formed include gratings formed as grating annular zones having a blazed shape (hereinafter, the dichroic films are also denoted by reference numerals 11 and 12, and the mirror surface is also denoted by reference numeral 13). The annular zones are formed with an annular zone interval set based on a phase difference function calculated so as to provide a required optical power.

In this example, to simplify the explanation, the DOE 1 is assumed to be formed in a flat plate shape as a whole, and an envelope surface of edges of the gratings formed on each of the grating surfaces 11-13 and the surface 10 are assumed to be a plane.

Thus, non-monochromatic light entering the DOE 1 from the surface 10 is transmitted through the first layer 21, and then light in the first wavelength range included in the non-monochromatic light is reflected and diffracted at a predetermined diffraction order by the grating surface 11. The reflected and diffracted light is again transmitted through the first layer 21 to exit from the DOE 1 through the surface 10. Light in a wavelength range other than the first wavelength range included in the non-monochromatic light is transmitted through the grating surface 11 without being diffracted since the refractive indices of the first and second layers 21 and 22 are equal to each other.

Of the light transmitted through the grating surface 11 and the second layer 22, light in the second wavelength range is reflected and diffracted at the predetermined diffraction order by the grating surface 12, and then is again transmitted through the second layer 22 and the first layer 21 to exit from the DOE 1 through the surface 10 without being diffracted by the grating surface 11. Of the light transmitted through the second layer 22, light in a wavelength range other than the second wavelength is transmitted through the grating surface 12 without being diffracted since the refractive indices of the second and third layers 22 and 23 are equal to each other.

The light transmitted through the grating surface 12 and the third layer 23 is reflected and diffracted at the predetermined diffraction order by the grating surface 13, and is again transmitted through the third to first layers 23-21 to exit from the DOE 1 through the surface 10 without being diffracted by the grating surfaces 12 and 11.

In conventional reflective DOEs, since a grating surface set such that a diffraction efficiency becomes maximum for a certain wavelength range diffracts light in the entire wavelength range, it is difficult to reduce the above-described wavelength dependency of power. In contrast, the DOE 1 of this example can set, if optimizing the shape of each of the grating surfaces for the wavelength range which is desired to be diffracted by that grating surface (that is, the specific wavelength range), a power to diffract light in that wavelength range independently. As a result, the DOE 1 of this example can reduce chromatic aberration. That is, the grating surfaces 11 and 12 in the DOE 1 of this example have mutually different shapes according to the specific wavelength ranges for the reflective films respectively formed on the grating surfaces 11 and 12.

Figure 10:
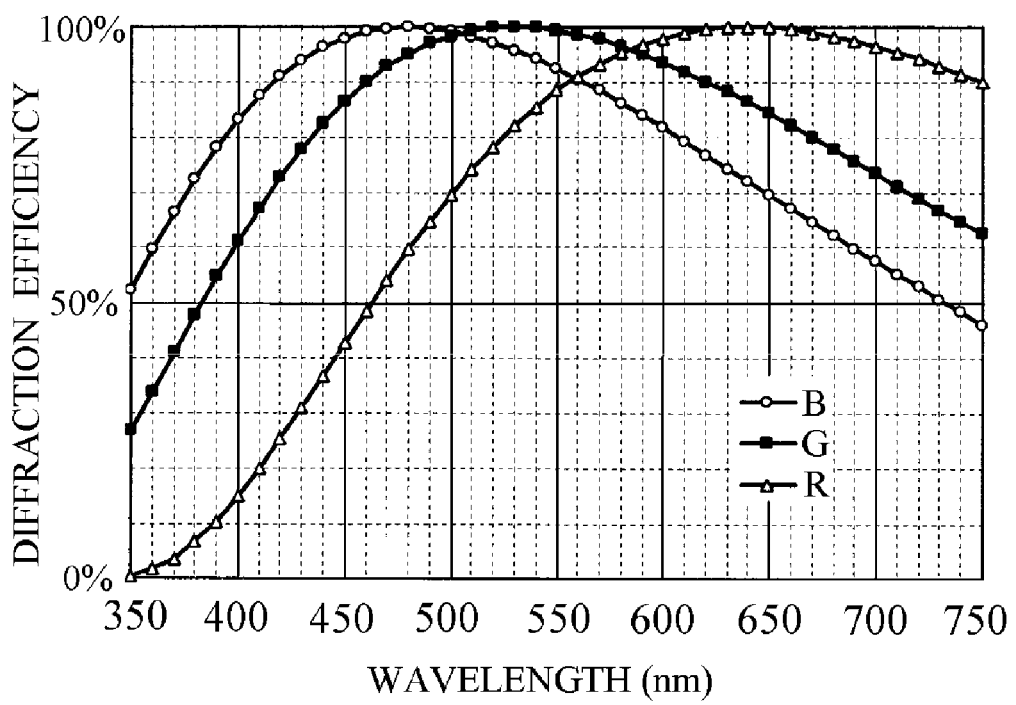
FIG. 10 is a graph showing diffraction efficiencies at a grating surface.

Moreover, the DOE 1 of this example can optimize the diffraction efficiency at each grating surface in an arbitrary wavelength range, therefore making it possible to ensure a high diffraction efficiency in a limited wavelength range to be reflected and diffracted as shown in FIG. 10.

Furthermore, in FIG. 1, reference character IL denotes non-monochromatic light (incident light) that impinges on a certain point on the DOE 1. The grating surface 11 reflects and diffracts the light in the first wavelength range including a wavelength $\lambda_1$, and transmits the light in the wavelength range other than the first wavelength range. The grating surface 12 reflects and diffracts the light in the second wavelength range including a wavelength $\lambda_2$, and transmits the light in the wavelength range other than the second wavelength range. The grating surface 13 reflects and diffracts the light in the wavelength range transmitted through the grating surfaces 11 and 12 including a wavelength $\lambda_3$.

Reference characters $DL_1$, $DL_2$ and $DL_3$ respectively denote light rays reflected and diffracted at the grating surfaces 11, 12 and 13. Reference characters $P_1$, $P_2$ and $P_3$ and $d_1$, $d_2$ and $d_3$ respectively denote annular zone intervals (pitches of the annular zones) P and grating heights d at the incident points of the light rays $DL_1$, $DL_2$ and $DL_3$ on the grating surfaces 11, 12 and 13. That is, the annular zone intervals $P_1$, $P_2$ and $P_3$ and the grating heights $d_1$, $d_2$ and $d_3$ on the grating surfaces 11, 12 and 13 are mutually different on a same incident ray axis along which the light rays $DL_1$, $DL_2$ and $DL_3$ trace.

Setting the annular zone intervals $P_1$, $P_2$ and $P_3$ such that the powers at the respective grating surfaces are equivalent to each other enables reduction of differences of the powers depending on wavelengths. Since in the DOE the power increases as the wavelength becomes longer, it is only necessary to set the annular zone intervals on the respective grating surfaces so as to satisfy the following relationship if the wavelengths are $$\lambda_3 < \lambda_2 < \lambda_1 \tag{1}$$

$$P_3 < P_2 < P_1 \tag{2}$$

When the DOE is an axisymmetric element, a phase difference function $\phi$ is generally expressed as follows:

$$\phi(r) = \sum_n^N C_n \cdot r^{2n}. \tag{3}$$

(r: distance from annular zone center)

The annular zone interval P(r) is expressed as follows:

$$P(r) = \lambda / \{d\phi(r)/dr\} \tag{4}$$

and therefore it is only necessary to set the annular zone intervals $P_1$, $P_2$ and $P_3$ as follows:

$$(P_1 : P_2 : P_3) = (\lambda_1 : \lambda_2 : \lambda_3) \tag{5}$$

Moreover, to improve the diffraction efficiency, it is only necessary to set the grating heights of the respective grating surfaces so as to become maximum at the wavelengths $\lambda_1$, $\lambda_2$ and $\lambda_3$. The wavelengths $\lambda_1$, $\lambda_2$ and $\lambda_3$ are not necessarily required to coincide with the wavelengths when the above-described annular zone intervals are set, and may be appropriate values for wavelength spectra to be reflected at the respective grating surfaces.

The grating height d is expressed as follows:

$$d = m \cdot \lambda / \psi \tag{6}$$

($\psi$ represents an optical path difference),
and therefore the grating heights $d_1$, $d_2$ and $d_3$ only have to be set as follows if the wavelengths are $\lambda_3 < \lambda_2 \lambda_1$, $$d_3 < d_2 < d_1 \tag{7}$$

That is, the grating heights $d_1$, $d_2$ and $d_3$ only have to approximately satisfy the following relationship:

$$d_1 : d_2 : d_3 = (\lambda_1 : \lambda_2 : \lambda_3) \tag{8}$$

As to wavelength dependency of the diffraction efficiency at each grating surface, as shown in FIG. 10, the diffraction efficiency shown by a vertical axis decreases as a wavelength of diffracted light (shown by a horizontal axis) departs further from a wavelength at which the diffraction efficiency is peak (hereinafter referred to as a "peak wavelength"). Therefore, it is desirable that a spectrum of light entering the DOE have a peak near the peak wavelengths of the respective grating surfaces and be as narrow as possible. For example, using a light source such as a laser and an LED whose peak of the spectrum is near the respective peak wavelengths enables reduction of unnecessary diffracted light. On the other hand, even if the spectrum of the light source is wide, providing plural color filters periodically with respect to pixels of a display element or an image pickup element enables acquisition of similar effects.

Example 2

Figure 2:
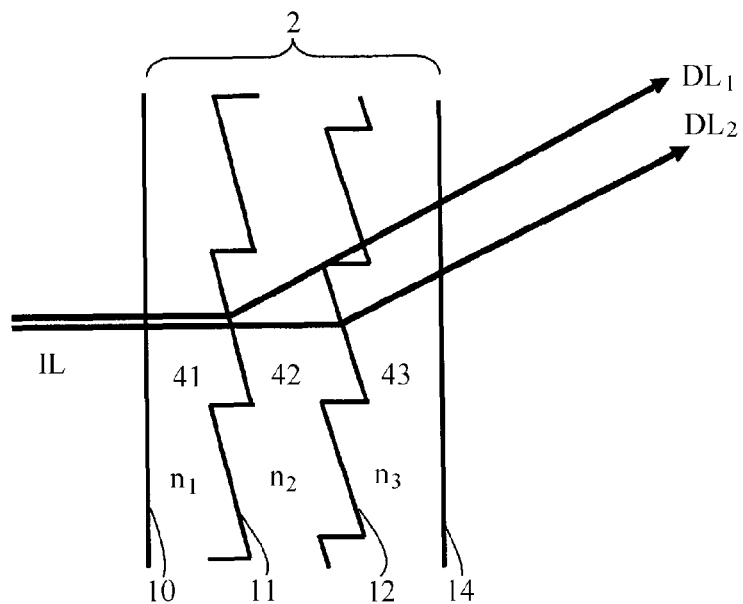
FIG. 2 schematically shows a structure of a transmissive DOE that is Example 2 of the present invention.

FIG. 2 shows a transmissive laminated DOE 2 that is a second example (Example 2) of the present invention. This DOE 2 is also constituted by laminating plural diffraction grating layers (diffraction gratings) each diffracting monochromatic light, which is the same as the DOE 1 of Example 1. The DOE 2 has a color correction function for two wavelengths.

The DOE 2 is constituted by laminating three light-transmissive media including a first layer 41, a second layer 42 and a third layer 43. The three light-transmissive media are different from each other, and refractive indices thereof are also mutually different. The refractive indices of the light-transmissive media forming the first layer 41, the second layer 42 and the third layer 43 are respectively represented by $n_1(\lambda)$, $n_2(\lambda)$ and $n_3(\lambda)$.

A grating surface 11 disposed between the first layer 41 and the second layer 42 and a grating surface 12 disposed between the second layer 42 and the third layer 43 are formed as grating surfaces having a blazed structure. However, the shapes of the blazed structures of the grating surfaces 11 and 12 are mutually different.

Light IL including at least light in wavelengths $\lambda_1$ and $\lambda_2$ enters the DOE 2 through a surface 10, and then exits from the DOE 2 through a surface 14. The grating surfaces 11 and 12 and the surface 10 and 14 may be provided with an anti-reflection film. Moreover, in order to make the first layer 41 and the third layer 43 thin, a light-transmissive substrate may be disposed further on a light entrance side than the surface 10 or further on a light exit side than the surface 14. The light-transmissive substrate serves as a holding member, which makes it possible to thin the layer on the light entrance side or on the light exit side.

The refractive indices $n_1(\lambda)$ and $n_2(\lambda)$ of the first and second layers 41 and 42 adjacent to each other in a lamination direction in which the first to third layers 41-43 are laminated with each other are at least different from each other for the wavelength $\lambda_1$ (one color light) and equal to each other for the other wavelength $\lambda_2$. That is, the first and second layers 41 and 42 have dispersion characteristics such that the following relationships are satisfied:

$$n_2(\lambda_1) < n_2(\lambda_1)$$

$$n_1(\lambda_2) = n_2(\lambda_2) \tag{9}$$

The grating surface 11 is formed such that an annular zone interval $P_1$ and a grating height $d_1$ can provide a required diffraction power and a required diffraction efficiency for the wavelength $\lambda_1$. Therefore, at the grating surface 11, the light in the wavelength $\lambda_1$ is transmitted therethrough and diffracted in a predetermined direction, and the light in the wavelength $\lambda_2$ is transmitted therethrough without being diffracted to enter the second layer 42.

Moreover, the refractive indices $n_2(\lambda)$ and $n_3(\lambda)$ of the second layer 42 and the third layer 43 adjacent to each other in the lamination direction are different from each other for at least the wavelength $\lambda_2$ (one color light) and equal to each other for the other wavelength $\lambda_1$. That is, the second layer 42 and the third layer 43 have dispersion characteristics satisfying the following relationships:

$$n_2(\lambda_2) < n_3(\lambda_2)$$

$$n_2(\lambda_1) = n_3(\lambda_1) \quad (10).$$

Moreover, the grating surface 12 is formed such that an annular zone interval $P_2$ and a grating height $d_2$ can provide a required diffraction power and a required diffraction efficiency for the wavelength $\lambda_2$. Therefore, at the grating surface 12, the light in the wavelength $\lambda_2$ is transmitted therethrough and diffracted in a predetermined direction, and the light in the wavelength $\lambda_1$ is transmitted therethrough without being diffracted to enter the third layer 43.

Figure 11:
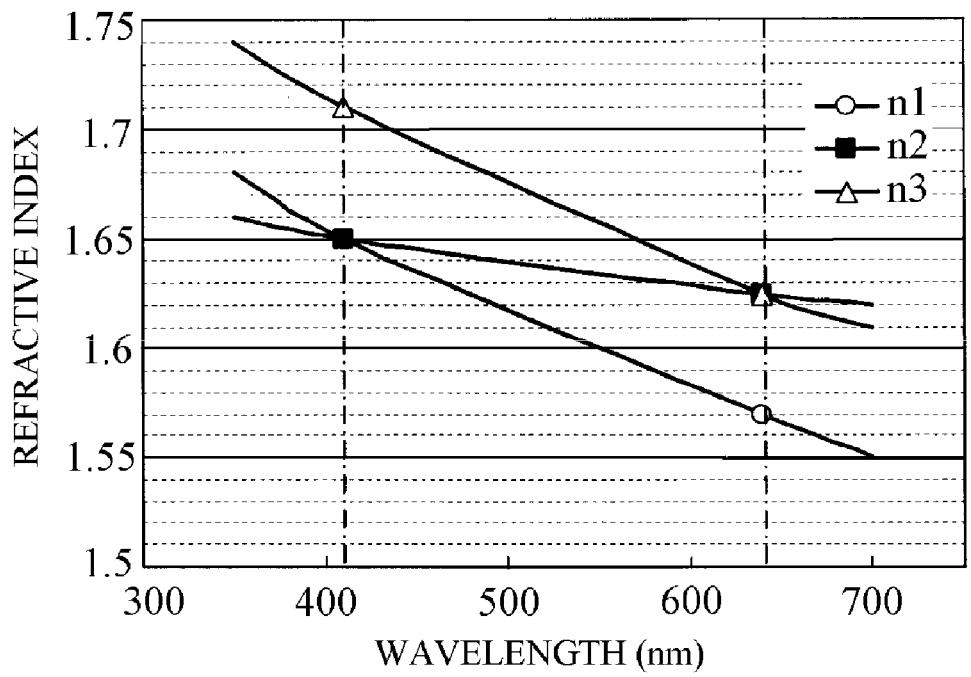
FIGS. 11 and 12 are graphs showing dispersion characteristics of materials used for the transmissive DOE of Example 2.

FIG. 11 shows the dispersion characteristics of the light-transmissive media forming the first to third layers 41-43. In these characteristics, $\lambda_1$ is 640 nm and $\lambda_2$ is 410 nm. Forming the DOE 2 using materials having such dispersion characteristics enables application of the DOE 2 to an optical element such as a pickup lens that converges two laser light fluxes in the wavelengths $\lambda_1$ and $\lambda_2$ on focal points different from each other on a same axis.

Although description was made of the case where the DOE independently transmits and diffracts two color lights of mutually different wavelengths, it is only necessary to satisfy the following condition when the DOE independently transmits and diffracts three or more color lights of mutually different wavelengths.

In a case where light entering the DOE includes N spectra each having a wavelength $\lambda i$ as a peak (i=1 to N, $\lambda_i > \lambda_{i+1}$ and N≥2), the DOE is constituted by at least N+1 layers formed of mutually different light-transmissive media each having a refractive index $n_j$ (j=1 to N+1). The light-transmissive medium is disposed as a layer further on the light entrance side as the index j is smaller. In this case, it is only necessary that a wavelength characteristic of each layer is as follows:

when $j=i$, $n_j(\lambda_i) < n_{j+i}(\lambda i)$ when $j>i$, $n_j(\lambda_i) = n_{i+1}(\lambda_i)$ and when $j<i$, $n_j(\lambda_i) = n_i(\lambda_i) \quad (11).$ The above-described example of the DOE 2 corresponds to a case where N=2 (i=1 to 2, j=1 to 3). Such a DOE transmits and diffracts in a predetermined direction light of a certain wavelength $\lambda_{i=k}$ at respective grating surfaces, and transmits light of other wavelengths $\lambda_{i\neq k}$ without diffracting it.

Figure 12:
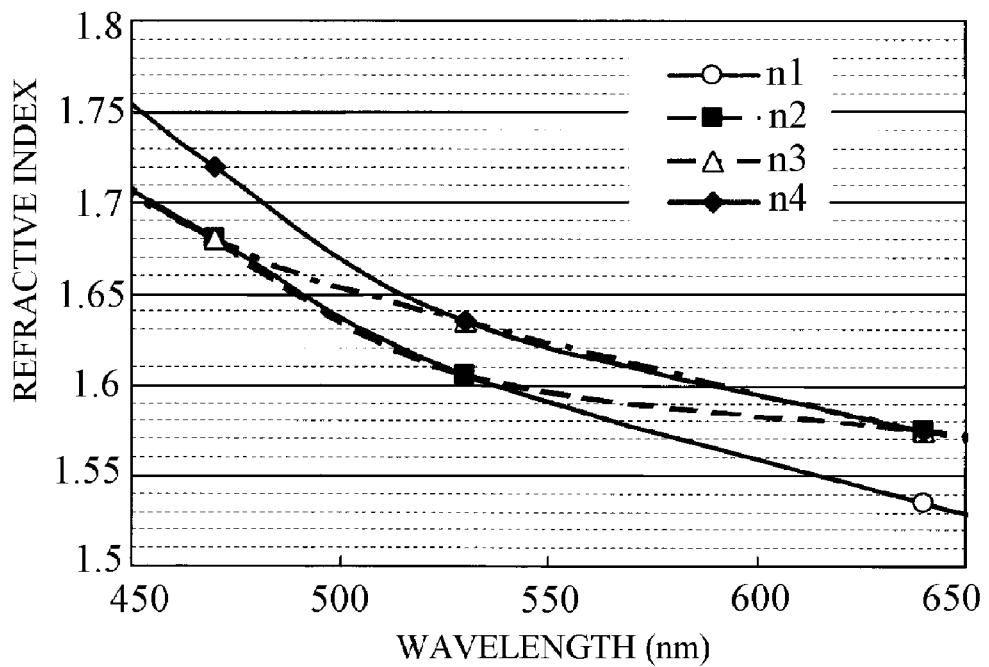

FIG. 12 shows dispersion characteristics of the respective light-transmissive media required for a case of N=3 as an example. This example assumes that three wavelengths are $\lambda_1$=640 nm, $\lambda_2$=530 nm and $\lambda_3$=470 nm. The DOE has a structure including four layers. Light of the wavelength $\lambda_1$ is diffracted by a grating surface between a first layer and a second layer independently, light of the wavelength $\lambda_2$ is diffracted by a grating surface between the second layer and a third layer independently, and light of the wavelength $\lambda_3$ is diffracted by a grating surface between the third layer and a fourth layer independently.

Methods for providing the dispersion characteristics required for the respective light-transmissive media include, for example, a method that dopes inorganic nanoparticles into a light-transmissive organic material.

Example 3

Figure 3:
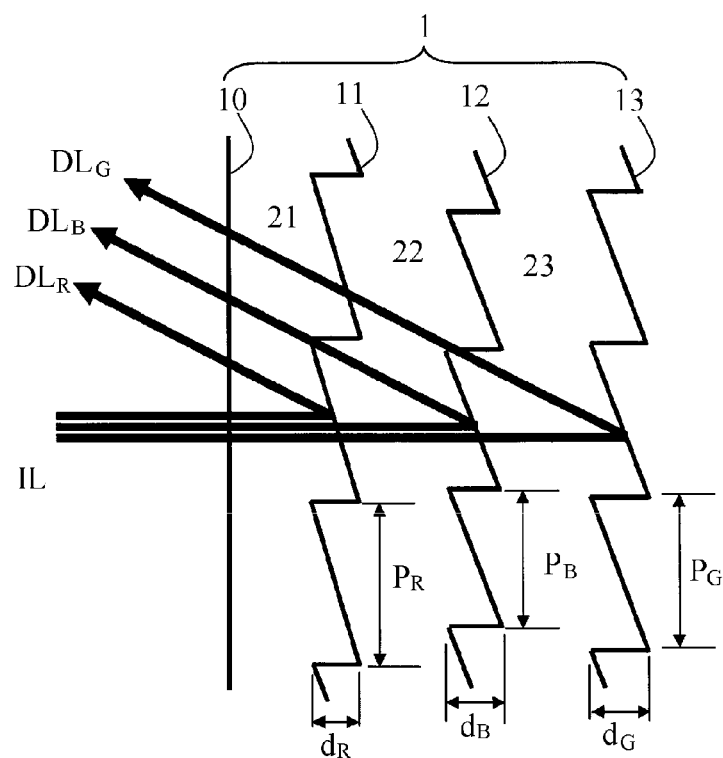
FIG. 3 schematically shows a structure of a reflective DOE that is Example 3 of the present invention.

FIG. 3 shows a specific example of the reflective laminated DOE 1 described in Example 1. This DOE 1 is constituted by laminating three layers of diffraction gratings including the first layer 21 to the third layer 23, the layers being formed of the same light-transmissive media. The grating surface 11 is formed between the first layer 21 and the second layer 22, the grating surface 12 is formed between the second layer 22 and the third layer 23, and the grating surface 13 is formed on the back surface of the third layer 23.

A dichroic film is formed on the grating surface 11. This dichroic film reflects and diffracts light in a wavelength range (first wavelength range) from red (R) to infrared. Another dichroic film is formed on the grating surface 12. This dichroic film reflects and diffracts light in a wavelength range (second wavelength range) from ultraviolet to blue (B). The grating surface 13 reflects and diffracts at least light in a wavelength range of green (G) (third wavelength range) transmitted through the grating surfaces 11 and 12.

This structure enables the two dichroic films to independently reflect and diffract the light in the first wavelength range that is a short side wavelength range and the light in the second wavelength range that is a long side wavelength range. Furthermore, this structure enables at least the grating surface that reflects the light in the third wavelength range between the first and second wavelength ranges to diffract that light with a required power.

Moreover, this structure only requires to set reflectance characteristics of the two light-entrance side surfaces like a low-pass filter (some nm or less) or a high-pass filter (some nm or more), that is, does not require to set them like a band-pass filter, which enables simplification of the structure of the dichroic film. Even in a case where the grating surface 11 reflects the light in the wavelength range from blue to ultraviolet and the grating surface 12 reflects the light in the wavelength range from red to infrared, this effect is similarly obtained.

In other words, in this DOE 1, one and the other of the first grating surface 11 that reflects the light in the wavelength range from blue to ultraviolet and the second grating surface 12 that reflects the light in the wavelength range from red to infrared are arranged in no particular order from the light entrance side. Furthermore, the third grating surface 13 that reflects the light in a wavelength range transmitted through the dichroic films formed on the first and second grating surfaces 11 and 12 may be formed on a side opposite to the light entrance side with respect to the first and second grating surfaces 11 and 12.

Figure 4:
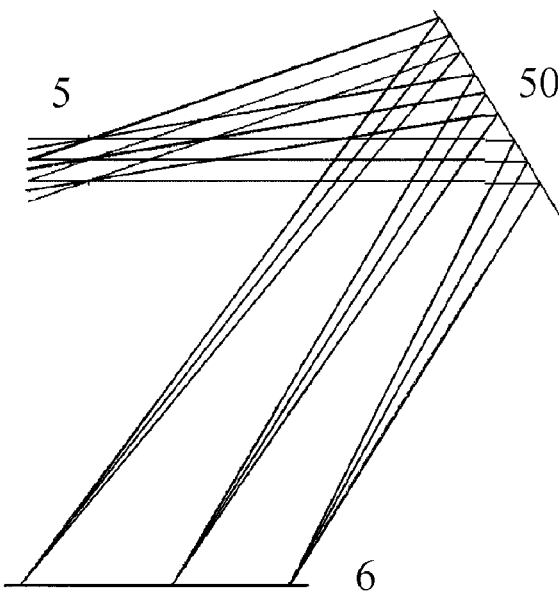
FIG. 4 shows an optical system including the reflective DOE of Example 3.

FIG. 4 shows an optical system that forms an image by using a reflective DOE 50 which is decentered, the optical system having a diameter of an entrance pupil of 5 mm and an angle of view of 20 degrees. Numerical data of the optical system is shown below.

An origin of coordinates is set to a center of the entrance pupil, and an axis passing the center of the pupil and extending in a direction orthogonal to the pupil is defined as a Z axis. An axis extending in a direction orthogonal to the Z axis and in a direction along a decentering cross section (meridional cross section) is defined as a Y axis. An axis extending in directions orthogonal to the Y axis and the Z axis is defined as an X axis, and θ represents a rotational decentering angle around the X axis.

| SURFACE NUMBER | CURVATURE RADIUS | Y POSITION | Z POSITION | θ |
|---|---|---|---|---|
| OBJECT | ∞ | 0.000 | ∞ | |
| 1: (PUPIL) | ∞ | 0.000 | 0.000 | |
| 2: | ∞ | 0.000 | 50.000 | |
| 3: | ∞ | 0.000 | 50.000 | |
| 4: | ∞ | −0.7714 | 50.000 (DOE) | 30° |
| 5: | ∞ | −0.7714 | 50.000 | 90° |
| 6: | ∞ | −50.7714 | 50.000 | 90° |
| IMAGE PLANE: | ∞ | −50.7714 | 50.000 | 90° |

This optical system is configured such that an incident angle is larger than a reflection angle. Design wavelengths are $\lambda_R=640$ nm, $\lambda_G=530$ nm and $\lambda_B=480$ nm, and a design diffraction order is +5th order. A phase difference function of each layer is expressed as follows:

$$\psi(x, y) = \sum_m^N \sum_n^N C_{nm} x^n y^m (n, m : \text{integers})$$

When an axis on which a light ray passing the center of the pupil and forming an angle of view of zero proceeds is defined as a z axis, axes orthogonal to the z axis and orthogonal to each other are defined as an x axis and a y axis, and the DOE is decentered and rotated about the x axis, a y-z plane is referred to as the meridional cross section and a x-z plane is referred to as a sagittal cross section. The following description will be made only in the meridional cross section. In this case, since only a term of y has to be considered, the phase difference function is expressed as follows:

$$\psi(y) = \sum_m^N C_m y^m$$

$C_1 = -3.75050 \cdot 10^{-3}$
$C_2 = -1.28103 \cdot 10^{-3}$
$C_3 = 1.18215 \cdot 10^{-5}$
$C_4 = 2.30640 \cdot 10^{-8}$
$C_5 = -1.35259 \cdot 10^{-7}$
$C_6 = 1.03332 \cdot 10^{-8}$
$C_7 = 1.79335 \cdot 10^{-10}$
$C_8 = -5.01001 \cdot 10^{-11}$
$C_9 = 2.06563 \cdot 10^{-12}$
$C_{10} = -2.77163 \cdot 10^{-14}$ The annular zone interval $P_k(y)$ is expressed as follows based on the expression (4):

$$P_k(y) = \lambda_k / \{d\varphi(r)/dr\} \quad (12)$$

$$= \lambda_k / \{\Sigma m \cdot C_m y^{m-1}\} (k \text{ denotes color}).$$

As to a principal ray forming an angle of view of +5°, the incident angle thereof on the DOE (that is, on the surface 10) is 25° and a distance y from an optical axis of the optical system to an incident point of the principal ray on the DOE is 5.65 mm. The above-described principal ray exits from the DOE at a reflection angle of 30.65°. The annular zone intervals $P_k$ on the grating surfaces that reflect and diffract the respective color lights are as follows:

$P_R = 36.7$ μm,
$P_G = 33.7$ μm, and
$P_B = 27.5$ μm.

Grating heights $d_k$ are as follows:
$d_R = 2.15$ μm,
$d_G = 1.97$ μm, and
$d_B = 1.61$ μm.

In this case, if the annular zone intervals are equal to each other, a chromatic aberration of magnification (R-B) increases to about 1.8 mm and a longitudinal chromatic aberration (R-B) increases to 19 mm. However, the above-described setting of the annular zone intervals enables suppression of these aberrations to theoretically zero.

Next, description will be made of a configuration of the dichroic film. Description herein will be made of a case where the dichroic film reflects and diffracts light in the wavelength from ultraviolet to blue, and transmits light in the wavelengths of red and green without diffracting them. When the wavelength is represented by $\lambda_B$, a high refractive index layer is denoted by H, and a low refractive index layer is denoted by L, the configuration of the dichroic film is expressed as follows:

$(0.5HL0.5H)^9$.

This shows a configuration in which a combination of the layer H with a layer thickness of $\lambda_B/8$, the layer L with a layer thickness of $\lambda_B/4$ and the layer H with a layer thickness of $\lambda_B/8$ is repeated nine times from the light entrance side.

Figure 5:
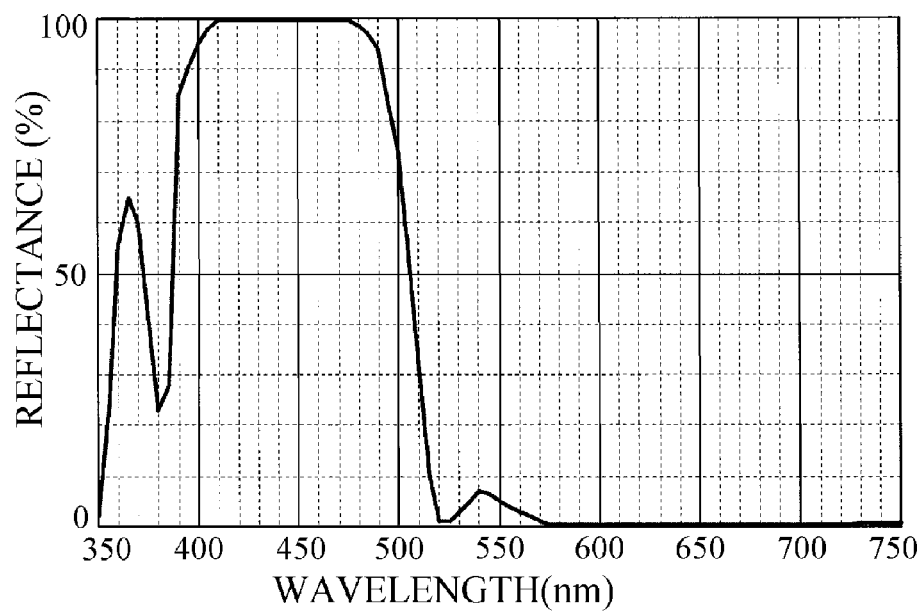
FIG. 5 is a graph showing a reflectance characteristic of a dichroic film being used in the reflective DOE of Example 3.

FIG. 5 shows wavelength dependency of reflectance of P-polarized light when assuming that the wavelength $\lambda_B$ is 480 nm, a refractive index $n_H$ of the layer H is 1.7 and a refractive index $n_L$ of the layer L is 1.5. The reflectance is approximately 0% in a wavelength range of 475 nm or less and approximately 100% in a wavelength range of 575 nm or more.

Figure 6:
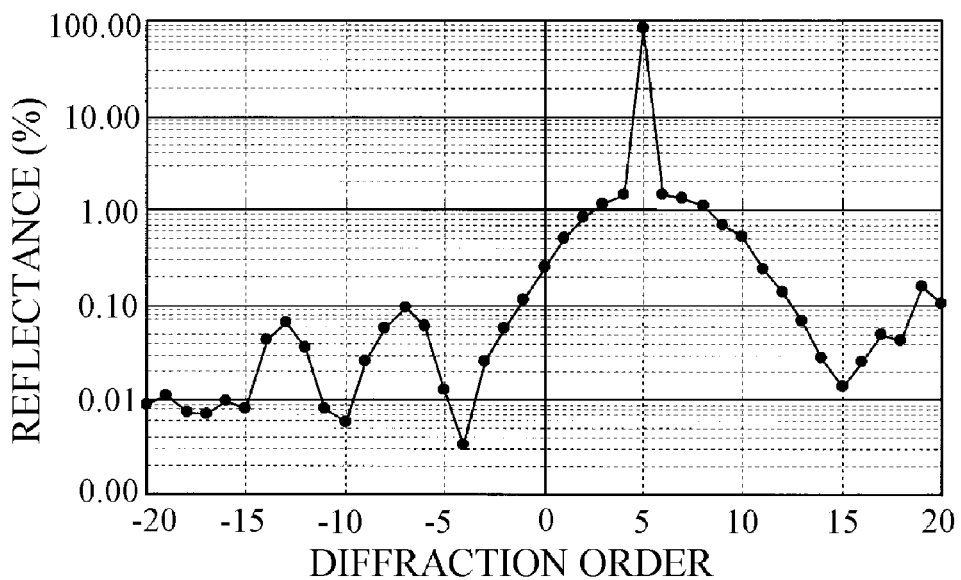
FIG. 6 is a graph showing a reflective diffraction efficiency of the reflective DOE of Example 3 for a wavelength $\lambda_B$.
Figure 7:
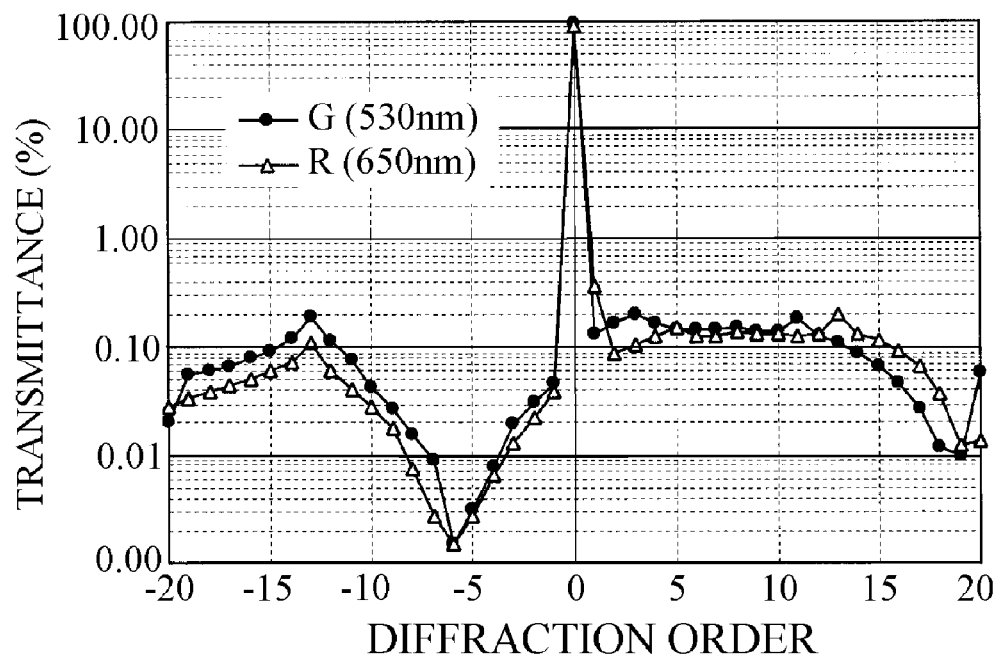
FIG. 7 is a graph showing transmissive diffraction efficiencies of the reflective DOE of Example 3 for wavelengths $\lambda_G$ and $\lambda_R$.

FIG. 6 shows a reflective diffraction efficiency of the principal ray of the wavelength $\lambda_B$ when the incident angle thereof is 45° and the incident point (y) thereof is 3.0 mm. FIG. 7 shows transmissive diffraction efficiencies of principal rays of the wavelengths $\lambda_G$ and $\lambda_R$. The transmissive diffraction efficiencies are calculated by rigorous coupled wave analysis. The reflective diffraction efficiency of the +5th order diffracted light of the wavelength $\lambda_B$ is 82.39%, and the transmittances of the 0th order diffracted lights of the wavelengths $\lambda_R$ and $\lambda_G$ are 94.6% and 90.1%, respectively. Moreover, relative intensities of the transmissive diffracted lights of diffraction orders other than the 0th order in the wavelengths $\lambda_R$ and $\lambda_G$ are less than 0.2%, which means that most of the light of the wavelength $\lambda_B$ is reflected and diffracted and most of the lights of the other wavelengths are transmitted without being diffracted.

Although the intensities of diffracted lights of the wavelength $\lambda_B$ whose diffraction orders are other than the +5th order are about 1%, such slightly high intensities can be reduced by adjustment of the shape of the grating such as tilting of a grating side face.

Example 4

Figure 8:
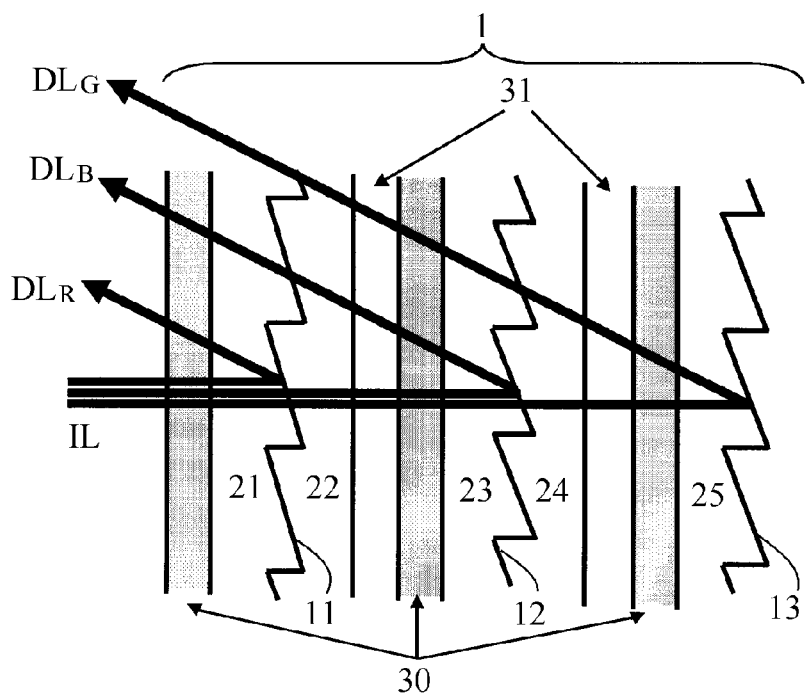
FIG. 8 schematically shows a structure of a reflective DOE that is Example 4 of the present invention.

FIG. 8 shows a fourth example (Example 4) as another specific example of the reflective laminated DOE 1 described in Example 1. Although Example 3 forms portions between the grating surfaces by using a single (same) light-transmissive medium to reduce the thickness of the DOE, this example respectively forms diffraction gratings on light-transmissive substrates and combines these diffraction gratings to produce the reflective laminated DOE.

In FIG. 8, a reflective DOE in which a dichroic film is formed on a grating surface 11 between layers 21 and 22 formed of a same light-transmissive medium whose refractive index is $n(\lambda)$ is formed on a light-transmissive substrate 30 whose refractive index is $n_p(\lambda)$, which constitutes a first reflective diffraction unit. The refractive index $n(\lambda)$ may be equal to the refractive index $n_p(\lambda)$ or may be different therefrom. The dichroic film formed on the grating surface 11 reflects and diffracts light of a wavelength $\lambda_R$ (R-light).

Further, another reflective DOE in which a dichroic film is formed on a grating surface 12 between layers 23 and 24 formed of the same light-transmissive medium whose refractive index is $n(\lambda)$ is formed on another light-transmissive substrate 30 whose refractive index is $n_p(\lambda)$, which constitutes a second reflective diffraction unit. The refractive index $n(\lambda)$ may be equal to the refractive index $n_p(\lambda)$ or may be different therefrom. The dichroic film formed on the grating surface 12 reflects and diffracts light of a wavelength $\lambda_B$ (B-light).

Moreover, still another reflective DOE in which a dichroic film is formed on a grating surface 13 of a layer 25 formed of the light-transmissive medium whose refractive index is $n(\lambda)$ is formed on still another light-transmissive substrate 30 whose refractive index is $n_p(\lambda)$, which constitutes a third reflective diffraction unit. The refractive index $n(\lambda)$ may be equal to the refractive index $n_p(\lambda)$ or may be different therefrom. The grating surface 13 is formed as a mirror surface that reflects and diffracts light of a wavelength $\lambda_G$ (G-light).

The first to third reflective diffraction units are disposed adjacently to each other so as to form air layers 31 therebetween to be laminated with each other.

Boundaries of the substrates 30 and the layers (diffraction gratings) do not influence diffraction. If the substrates 30 are parallel plain plates, an incident angle of the light on each layer does not change. Even when the substrates 30 are curved plates and thereby have refractive powers, it is only necessary to optimize a phase difference function for each layer according to the refractive powers.

Figure 9:
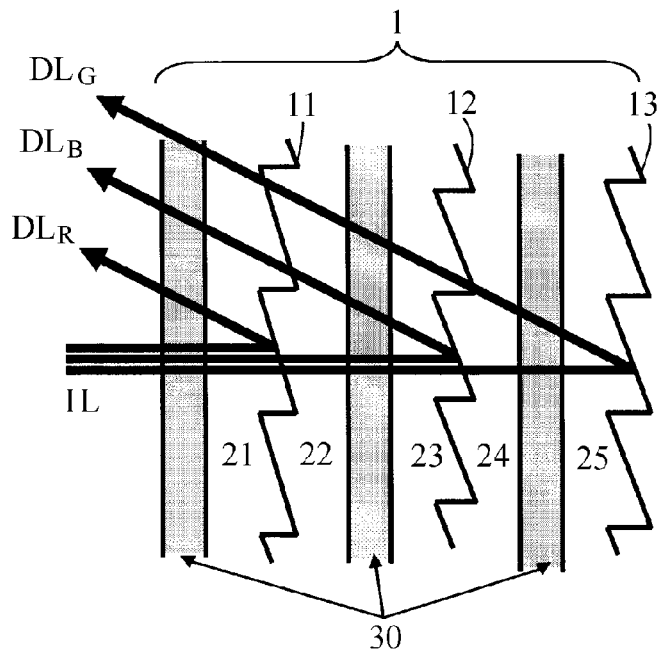
FIG. 9 schematically shows a structure of a reflective DOE that is Example 4 of the present invention.

The first to third reflective diffraction units may be disposed in contact with each other so as not to form the air layers 31 therebetween to be laminated with each other, as shown in FIG. 9.

In each of the above-described examples, as well as in Examples 1 and 3, a diffraction power can be set independently for each color light.

Example 5

Description will be made of a fifth example (Example 5) as still another specific example of the reflective laminated DOE 1 described in Example 1. Although in Examples 3 and 4 the reflective laminated DOE is used alone in the optical system, the reflective laminated DOE may be used in combination with refractive elements or reflective elements.

Figure 13:
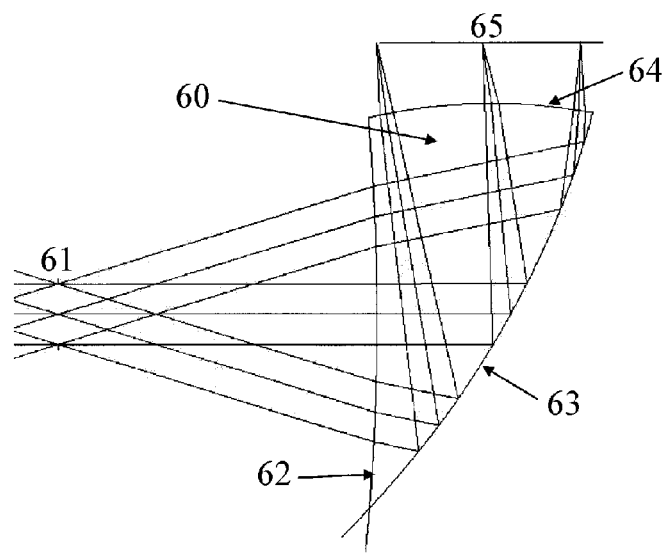
FIG. 13 shows an optical system that is Example 5 of the present invention.

FIG. 13 shows an optical system in which the reflective laminated DOE is formed on one of three surface of a prism element 60. This optical system can be used as an image taking optical system of a camera with an image pickup element such as a CCD sensor or a CMOS sensor disposed at a surface 65. Furthermore, this optical system can be used as a displaying optical system of an image display apparatus with a display element such as a liquid crystal panel disposed at the surface 65, the displaying optical system enlarging an image formed on the display element such that the enlarged image can be observed from a pupil 61.

In the image taking optical system, external light from an entrance pupil 61 enters the prism element 60 through its surface 62, is reflected by a backside of a surface 63 to exit from the prism element 60 through its surface 64, and then is introduced to the image pickup element disposed at the surface 65. The surface 63 is provided with the DOE.

This example has a relationship that a reflection angle is larger than an incident angle to reduce a thickness and a size of the prism element 60. Numerical data of the above-described optical system is shown below. A coordinate system in the numerical data is the same as that described in Example 3.

| SURFACE NUMBER | CURVATURE RADIUS | Y POSITION | Z POSITION | θ | refractive index |
|---|---|---|---|---|---|
| OBJECT | ∞ | 0.000 | ∞ | 0.000° | |
| 1: (PUPIL) | ∞ | 0.000 | 0.000 | 0.000° | |
| 2: | ∞ | 0.000 | 0.000 | 0.000° | |
| 3: | −200.000 | 0.000 | 25.000 | 30.000° | 1.57090 |
| 4: | −80.000 | 2.676 | 34.000 | 90.000° | 1.57090 (DOE, reflection) |
| 5: | ∞ | 2.676 | 34.000 | 90.000° | 1.57090 |
| 6: | 40.000 | −17.324 | 34.000 | 90.000° | |
| 7: | ∞ | −22.324 | 34.000 | 90.000° | |
| IMAGE PLANE: | ∞ | −22.324 | 34.000 | 90.000° | |

The optical system has an angle of view of ±20 degrees and a diameter of the entrance pupil of 5 mm. As in Example 3, in the decentering cross section (meridional cross section), when only the term of y is considered, a phase difference function of the DOE is expressed as follows:

$$\psi(y) = \sum_m^N C_m y^m$$

$C_1 = -1.13323 \cdot 10^{-1}$
$C_2 = 9.94878 \cdot 10^{-4}$
$C_3 = 2.14809 \cdot 10^{-6}$
$C_4 = -2.88178 \cdot 10^{-6}$
$C_5 = -6.97048 \cdot 10^{-8}$
$C_6 = 2.17443 \cdot 10^{-8}$
$C_7 = 6.51869 \cdot 10^{-10}$
$C_8 = -5.24502 \cdot 10^{-11}$
$C_9 = -2.56617 \cdot 10^{-12}$
$C_{10} = -2.56520 \cdot 10^{-14}$.

In this case, for example, the annular zone intervals $P_k$ on the DOE at an incident point where a light ray for an angle of view of 0° are calculated as follows, as in Example 3, since the incident angle thereof is 23.37° and a diffraction angle thereof is 45.4649°:

$P_R = 5.648$ μm,
$P_G = 5.185$ μm, and
$P_B = 4.236$ μm.

And, grating heights $d_k$ are as follows:
$d_R = 1.37$ μm,
$d_G = 1.25$ μm, and
$d_B = 1.02$ μm.

Example 6

Figure 14:
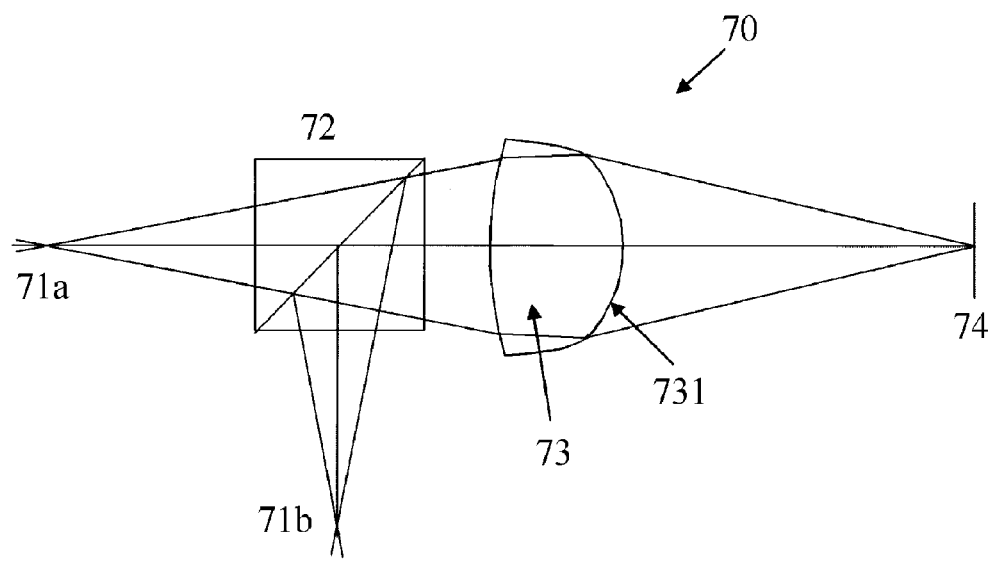
FIG. 14 shows an optical system that is Example 6 of the present invention.

Description will be made of a transmissive laminated DOE as a specific example (Example 6) of the transmissive laminated DOE 2 described in Example 2. FIG. 14 shows an optical system that collects each of two beams emitted from laser light sources 71a and 71b on a same image plane 74 by using a lens 73, the two beams being lights of mutually different wavelengths. An exit surface 731 of the lens 73 is provided with the transmissive laminated DOE of this example.

Figure 15:
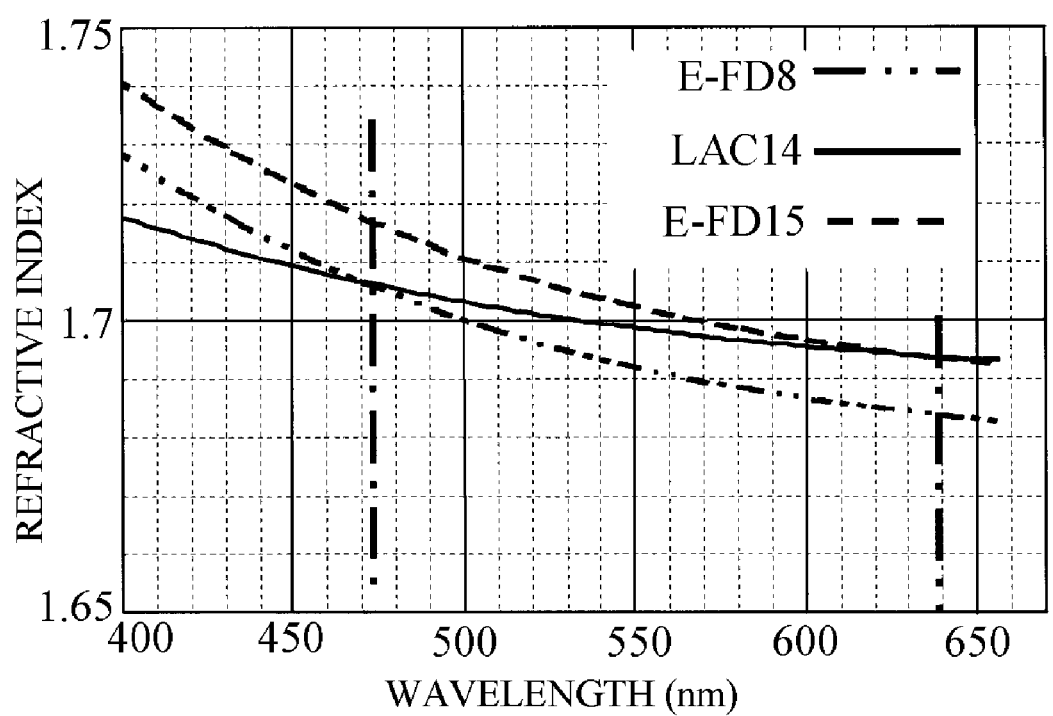
FIG. 15 is a graph showing dispersion characteristics of a material used for a transmissive DOE included in the optical system of Example 6.

Formation of two grating surfaces that transmit and diffract two lights of mutually different wavelengths independently requires three light-transmissive media having the characteristics shown in FIG. 11. In this example of the configuration shown in FIG. 2, E-FD8 is used as the light-transmissive medium for the first layer 41, LAC14 is used as the light-transmissive medium for the second layer 42, and E-FD15 is used as the light-transmissive medium for the third layer 43 (Those glasses are manufactured by HOYA corporation). The two wavelengths are set to $\lambda_1=640$ nm and $\lambda_2=473$ nm. FIG. 15 shows dispersion characteristics of E-FD8, LAC14 and E-FD15.

Moreover, numerical data of the optical system of this example is shown below. A coordinate system is also the same as that described in Example 3.

| SURFACE NUMBER | CURVATURE RADIUS | Y POSITION | Z POSITION | θ | refractive index |
|---|---|---|---|---|---|
| OBJECT | ∞ | 0.000 | −8.000 | 0.000° | Air |
| 1: | 8.157 | 0.000 | −3.000 | 0.000° | 1.57090 |
| 2: (PUPIL) | −3.148 | 0.000 | 0.000 | 0.000° | (DOE) |
| ASPHERIC SURFACE: | | | | | |
| K: −0.323650 | A: 0.474126E−02 | | B: −0.162703E−03 | | |
| C: −0.711399E−05 | D: −0.736135E−05 | | E: −0.799111E−06 | | |
| F: −0.315013E−06 | G: −0.413586E−07 | | H: −0.174572E−07 | | |
| J: −0.275514E−08 | | | | | |
| 3: | ∞ | 0.000 | 0.000 | 0.000° | Air |
| IMAGE PLANE: | ∞ | 0.000 | 10.000 | 0.000° | |

An entrance pupil has a diameter of 5 mm. The surface (DOE substrate surface) 2 is an aspheric surface (ASP) that is expressed by the following function:

$$z(r)=cr^2/[1+\{1-(1+K)\cdot c^2 \cdot r^2\}]^{1/2} \cdot (Ar^4+Br^6+Cr^8+Dr^{10}+Er^{12}+Fr^{14}+Gr^{16}+Hr^{18}+hr^{20})$$

where K represents a conic coefficient, and c represents a curvature radius. "E-XX" means "$\times 10^{-XX}$".

The surface 2 is a rotationally symmetric surface, and therefore the phase difference function of the DOE is expressed as follows:

$$\psi(r) = \sum_m^N C_m r^{2m}$$

The coefficients $C_m$ of the grating surface 11 (for the wavelength $\lambda_1$) between the first second layers are set as follows:
$C_1=-8.13200 \cdot 10^{-3}$
$C_2=7.11800 \cdot 10^{-4}$
$C_3=9.45300 \cdot 10^{-5}$
$C_4=6.77600 \cdot 10^{-6}$
$C_5=4.32300 \cdot 10^{-6}$
$C_6=5.87300 \cdot 10^{-7}$
$C_7=9.39500 \cdot 10^{-8}$
$C_8=3.30800 \cdot 10^{-8}$
$C_9=9.40400 \cdot 10^{-9}$
$C_{10}=1.48300 \cdot 10^{-9}$.

Moreover, the coefficients $C_m$ of the grating surface (for the wavelength $\lambda 2$) between the second and third layers are set as follows:
$C_1=-6.37900 \cdot 10^{-3}$
$C_2=7.10000 \cdot 10^{-4}$
$C_3=9.46700 \cdot 10^{-5}$
$C_4=7.49500 \cdot 10^{-6}$
$C_5=4.33200 \cdot 10^{-6}$
$C_6=5.92300 \cdot 10^{-7}$
$C_7=9.63500 \cdot 10^{-8}$
$C_8=3.34900 \cdot 10^{-8}$
$C_9=9.52100 \cdot 10^{-9}$
$C_{10}=1.51900 \cdot 10^{-9}$.

While the present invention has been described with reference to exemplary examples (embodiments), it is to be understood that the invention is not limited to the disclosed exemplary examples. The scope of the following claims is to be accorded the broadest interpretation so as to encompass all modifications, equivalent structures and functions.

This application claims the benefit of Japanese Patent Application No. 2009-241989, filed on Oct. 21, 2009, which is hereby incorporated by reference herein in its entirety.

INDUSTRIAL APPLICABILITY

The present invention can provide a laminated diffractive optical element with reduced chromatic aberration generated due to diffraction while having a strong power.

The invention claimed is:

1. A laminated diffractive optical element comprising:
   plural diffraction gratings laminated with each other, the respective diffraction gratings being formed of a same light-transmissive material; and
   plural reflective films formed on grating surfaces of the respective diffraction gratings, each of the reflective films being disposed between the diffraction gratings,
   wherein each of the reflective films reflects light in a specific wavelength range and transmits light in a wavelength range different from the specific wavelength range, the specific wavelength ranges for the respective reflective films being different from each other,
   wherein the grating surfaces of the respective diffraction gratings are formed in mutually different blazed shapes according to the specific wavelength ranges for the respective reflective films, and
   wherein the grating surfaces include at least (a) a first grating surface that diffracts and reflects a first light in a first wavelength range as the specific wavelength range and transmits, without diffracting, light in a wavelength range other than the first wavelength range and (b) a second grating surface that diffracts and reflects a second light in a second wavelength range as the specific wavelength range and transmits, without diffracting, light in a wavelength range other than the second wavelength range.

2. A laminated diffractive optical element according to claim 1, wherein annular zone intervals and grating heights on the grating surfaces of the respective diffraction gratings on a same incident ray axis are different from each other.

3. A laminated diffractive optical element according to claim 2, wherein:
   from a light entrance side, the first grating surface and the second grating surface are disposed in this order or in an order reverse thereto,
   a first reflective film, among the plural reflective films, on the first grating surface reflects light in a wavelength range from ultraviolet to blue and a second reflective film, among the plural reflective films, on the second grating surface reflects light in a wavelength range from red to infrared, a third grating surface is disposed on a side opposite to the light entrance side with respect to the first and second grating surfaces, and a third reflective film, among the plural reflective films, on the third grating surface reflects light in a wavelength range transmitted through the reflective films formed on the first and second grating surfaces.

4. A laminated diffractive optical element according to claim 1, wherein:

from a light entrance side, the first grating surface and the second grating surface are disposed in this order or in an order reverse thereto, a first reflective film, among the plural reflective films, on the first grating surface reflects light in a wavelength range from ultraviolet to blue and a second reflective film, among the plural reflective films, on the second grating surface reflects light in a wavelength range from red to infrared, a third grating surface is disposed on a side opposite to the light entrance side with respect to the first and second grating surfaces, and a third reflective film, among the plural reflective films, on the third grating surface reflects light in a wavelength range transmitted through the reflective films formed on the first and second grating surfaces.

5. A laminated diffractive optical element, where light having at least three mutually different spectral peak wavelengths enters, the laminated diffractive optical element comprising:

plural diffraction gratings, whose number corresponds to the number of the peak wavelengths, laminated in close contact with each other, wherein a grating surface of each of the diffraction gratings is formed between mutually different light-transmissive materials disposed on a light entrance side and on a light exit side, wherein the grating surfaces of the diffraction gratings are formed in mutually different blazed shapes each corresponding to one of the peak wavelengths, and wherein, when N representing the number of the peak wavelengths of the light entering the optical element is three or more, $\lambda_i$ represents an i-th peak wavelength among the peak wavelengths, where i=1 to N and $\lambda_i > \lambda_{i+1}$, $n_j(\lambda)$ represents a refractive index for a wavelength $\lambda$ of a j-th light-transmissive material among the light transmissive materials disposed on the light entrance side and the light exit side of each diffraction grating, where j=1 to N+1, and the j-th light-transmissive material is disposed further on the light entrance as j is smaller, dispersion characteristics of the respective light-transmissive materials for wavelengths satisfy the following relationships:

when $j=i$, $n_j(\lambda_1) < n_{j+1}(\lambda_i)$, when $j>i$ and $j \leq N$, $n_j(\lambda_i) = n_{j+1}(\lambda_i)$, and when $j<i$, $n_j(\lambda_i) = n_{j+1}(\lambda_i)$.

6. A laminated diffractive optical element according to claim 5, wherein annular zone intervals and grating heights on the grating surfaces of the respective diffraction gratings on a same incident ray axis are different from each other.

7. An optical system comprising:
an image pickup element; and
a laminated diffractive optical element comprising:

plural diffraction gratings laminated with each other, the respective diffraction gratings being formed of a same light-transmissive material; and plural reflective films formed on grating surfaces of the respective diffraction gratings, each of the reflective films being disposed between the diffraction gratings, wherein each of the reflective films reflects light in a specific wavelength range and transmits light in a wavelength range different from the specific wavelength range, the specific wavelength ranges for the respective reflective films being different from each other, wherein the grating surfaces of the respective diffraction gratings are formed in mutually different blazed shapes according to the specific wavelength ranges for the respective reflective films, and wherein the grating surfaces include at least (a) a first grating surface that diffracts and reflects a first light in a first wavelength range as the specific wavelength range and transmits, without diffracting, light in a wavelength range other than the first wavelength range and (b) a second grating surface that diffracts and reflects a second light in a second wavelength range as the specific wavelength range and transmits, without diffracting, light in a wavelength range other than the second wavelength range.

8. An optical system comprising:
an image pickup element; and
a laminated diffractive optical element, where light having at least three mutually different spectral peak wavelengths enters, wherein the laminated diffractive optical element comprises:

plural diffraction gratings, whose number corresponds to the number of the peak wavelengths, laminated in close contact with each other, wherein a grating surface of each of the diffraction gratings is formed between mutually different light-transmissive materials disposed on a light entrance side and on a light exit side, wherein the grating surfaces of the diffraction gratings are formed in mutually different blazed shapes each corresponding to one of the peak wavelengths, and wherein, when N representing the number of the peak wavelengths of the light entering the optical element is three or more, $\lambda_i$ represents an i-th peak wavelength among the peak wavelengths, where i=1 to N and $\lambda_i > \lambda_{i+1}$, $n_j(\lambda)$ represents a refractive index for a wavelength $\lambda$ of a j-th light-transmissive material among the light transmissive materials disposed on the light entrance side and the light exit side of each diffraction grating, where j=1 to N+1, and the j-th light-transmissive material is disposed further on the light entrance as j is smaller, dispersion characteristics of the light-transmissive materials satisfy the following relationships:

when $j=i$, $n_j(\lambda_i) < n_{j+1}(\lambda_i)$, when $j>i$ and $j \leq N$, $n_j(\lambda_i) = n_{j+1}(\lambda_i)$, and when $j<i$, $n_j(\lambda_i) = n_{j+1}(\lambda_i)$.

* * * * *